United States Patent
Popper et al.

(10) Patent No.: US 6,895,985 B2
(45) Date of Patent: May 24, 2005

(54) SMART DEVICE AND SYSTEM FOR IMPROVED DOMESTIC USE AND SAVING OF WATER

(75) Inventors: Shay Popper, Kfar-Yona (IL); Ram Friedman, Moshav Ein-Eiron (IL); Aryeh Litbak, Rehovot (IL); Yaniv Petel, Hertzelia (IL)

(73) Assignee: Computerized Smart Faucet Ltd., Kfar Yona (IL)

( * ) Notice: Subject to any disclaimer, the term of this patent is extended or adjusted under 35 U.S.C. 154(b) by 0 days.

(21) Appl. No.: 10/801,645

(22) Filed: Mar. 17, 2004

(65) Prior Publication Data

US 2004/0182439 A1 Sep. 23, 2004

Related U.S. Application Data

(60) Provisional application No. 60/454,635, filed on Mar. 17, 2003.

(51) Int. Cl.⁷ ............................................. F16K 49/00
(52) U.S. Cl. ...................... 137/2; 137/337; 137/565.16; 417/12; 417/32
(58) Field of Search ........................... 137/337, 565.11, 137/565.16, 2; 417/12, 32

(56) References Cited

U.S. PATENT DOCUMENTS

| | | | | | |
|---|---|---|---|---|---|
| 4,351,712 A | * | 9/1982 | Cuomo et al. | ......... | 204/192.34 |
| 4,896,658 A | * | 1/1990 | Yonekubo et al. | ......... | 122/13.3 |
| 4,945,942 A | * | 8/1990 | Lund | ........................... | 137/337 |
| 5,205,318 A | * | 4/1993 | Massaro et al. | ............. | 137/337 |
| 5,261,443 A | * | 11/1993 | Walsh | ........................ | 137/337 |
| 5,351,712 A | * | 10/1994 | Houlihan | ..................... | 137/337 |
| 5,775,372 A | * | 7/1998 | Houlihan | ............... | 137/624.12 |
| 6,019,130 A | * | 2/2000 | Rump | ..................... | 137/601.1 |

\* cited by examiner

*Primary Examiner*—A. Michael Chambers
(74) *Attorney, Agent, or Firm*—Mark M. Friedman

(57) ABSTRACT

A system for providing a user with water at a desired temperature comprising a piping system that includes a hot water pipe and a cold water pipe, a pump coupled to the piping system and a smart water delivery device coupled to the piping system and to the pump and operative to allow circulation of water from the hot water pipe to the cold water pipe prior to delivery of water at a desired temperature to the user. The smart water delivery device includes two smart valves coupled to hot and cold water inlets, a smart outlet valve coupled to a device outlet, a microcontroller for controlling the actuation of the pump and of the smart valves, and at least one temperature sensor coupled to the microcontroller and used for sensing the water temperature.

16 Claims, 10 Drawing Sheets

Water tank sensors, main unit and communication

Communication with smart-valve units, wired or wireless, with or without low voltage power supply.

SMART DEVICE AND SYSTEM FOR IMPROVED DOMESTIC USE AND SAVING OF WATER

CROSS REFERENCE TO RELATED APPLICATIONS

The present invention claims priority from U.S. Provisional Patent Application No. 60/454,635, filed 17 Mar. 2003, the contents of which are incorporated herein by reference.

FIELD OF THE INVENTION

The present invention relates to water systems, and in particular to systems for efficient heating, delivery and use of water. More specifically, the present invention relates to smart delivery and control systems for hot and cold water in domestic use.

BACKGROUND OF THE INVENTION

Domestic water systems generally comprise separate hot and cold water piping, the hot water being heated in a hot water tank, both hot and cold water normally provided to a common mixed water delivery device (e.g. a faucet) in places such as baths, showers, and sinks. In normal use, the "turn-on" of such a mixed device by a consumer that wants water at a desired temperature includes the steps of:
a. waiting until the hot water arrives from the tank. This may take a while, in which time water is basically wasted. This waste is estimated to be on average about 10 liters (or more than 2 gallons) per turn-on;
b. adjusting the water temperature to a desired value in a process that includes trial (feeling the water temperature) and waiting until the water reaches that temperature; and
c. running the water even in cases when it is not needed, thus causing unnecessary waste.

A person taking a shower typically soaps him/herself while the water is running, and the same occurs for example during manual dishwashing. A faucet may be turned off while the water is not actually in use, but the majority of consumers do not do so, in order not to go through the "turn on" process again. Clearly, if one could temporarily turn off the flow of water and resume it instantly at the desired temperature, significant water and power savings could be attained.

A (partial) solution to the problem of waiting for hot water upon "turn-on" exists in hotels (but not normally in private homes). This solution consists of a circulation system that uses a double hot water pipe: the hot water pipe turns around and eventually returns to the hot water tank. Within the circle there is a small, preferably rotary pump that constantly circulates the hot water. The faucets are located close to a short mixed water pipe section that delivers water from the hot and cold pipes. Since at the entrance to this mixed pipe the water is always hot, when the faucet is turned on, the hot water arrives quite quickly. The disadvantages of this solution include a more expensive infrastructure (additional pipe to return the hot water) and waste of energy (both from the rotary pump which operates 24 hours a day, and from to continual leakage of heat from the hot water pipe to the surrounding environment). Obviously, this method is too expensive and energy-wasteful to be routinely applied in private homes.

The methods used in prior art for domestic hot water processing and delivery result in water and energy losses. It is thus desirable to provide devices, systems and methods that reduce these losses.

SUMMARY OF THE INVENTION

The present invention discloses a smart water delivery device and system for improved domestic use and saving of water. Specifically, the invention discloses a smart water delivery device operative to provide water at a desired temperature while preventing the waste occurring during present water turn-on events, when water is run and wasted until it becomes warm enough for use. Advantageously, the present invention does not require any addition to the piping infrastructure in a home (house, apartment, etc).

It is an object of the present invention to supply water to a domestic user at exactly a desired temperature.

It is another object of the present invention to supply water at the desired temperature without wasting cold water until the arrival of water at the desired temperature.

It is yet another object of the present invention to provide prior notice to the user when the water is insufficiently warm.

According to the present invention there is provided a system for providing a user with water at a desired temperature comprising: a piping system that includes a hot water pipe and a cold water pipe; a pump coupled to the piping system; and a water delivery device coupled to the piping system and to the pump and operative to allow circulation of water from the hot water pipe to the cold water pipe prior to delivery of water at a desired temperature to the user, whereby the circulation purges the hot water pipe of any cold water contained therewithin.

According to one feature of the system of the present invention, the operativeness to allow circulation of water from the hot water pipe to the cold water pipe prior to delivery of water at a desired temperature to the user is facilitated by a circulation mechanism.

According to another feature of the system of the present invention, the circulation mechanism is included in the water delivery device.

According to yet another feature of the system of the present invention, the circulation mechanism is externally attached to the water delivery device.

According to yet another feature of the system of the present invention, the water delivery device includes a hot water inlet coupled to the hot water pipe, a cold water inlet coupled to the cold water pipe, and a common outlet operative to receive hot and cold water flows from the hot and cold water inlets and to facilitate the water delivery.

According to yet another feature of the system of the present invention, the circulation mechanism further includes a hot water inlet valve and a cold water inlet valve respectively coupled to and operative to control water flow through the hot and cold water inlets, at least one temperature sensor operative to sense water temperature, and a controller responsive to inputs from the at least one temperature sensor and operative to actuate the hot and cold water inlet valves and the pump to obtain the water circulation and delivery.

According to yet another feature of the system of the present invention, the system further comprises an input/output device configured to provide input parameters to the controller and to receive and display output indications from the controller.

According to the present invention there is provided a method for delivering to a user water at a desired temperature comprising the steps of: providing a piping system that includes a hot water pipe and a cold water pipe; providing a water delivery device coupled to the piping system and configured to allow internal circulation of water from the hot to the cold pipe, the water delivery device having at least one outlet; bringing the water temperature near the at least one outlet to the desired temperature by purging the hot water pipe of any water having a temperature lower than the desired temperature, the purging including transferring of the lower temperature water through the water delivery device to the cold pipe; and delivering water at the desired temperature to the user through the at least one outlet.

According to the present invention there is provided a water delivery device comprising: a hot water inlet coupled to a hot water pipe; a cold water inlet coupled to a cold water pipe; a first outlet operative to receive hot and cold water flows from the hot and cold water inlets and to facilitate water delivery to a user; and a circulation mechanism operative to allow circulation of water from the hot water pipe to the cold water pipe prior to delivery of water at a desired temperature to the user through the first outlet.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention discloses a system and device for improved domestic use and saving of water. The system is operative to supply hot water at a desired temperature upon request. Preferably, the system uses a smart device with electronic sensing and control. In contrast with existing domestic systems, the system of the present invention uses the existing piping infrastructure, but ensures that the cold water present in a hot water pipe remains in the system instead of being wasted when a user opens a faucet and requires hot water. In a preferred embodiment, the smart device is a smart faucet, which facilitates the water saving and supplies water at a constant temperature, after adjustment by the user, thereby reducing and preventing the risk of scalding. The smart faucet may be made operative to stop the flow of water during soaping, and to resume the flow of water at the desired temperature immediately upon a new request. The smart faucet has a number of advantageous features: it can be integrated into "smart home" systems, it may be remotely controlled, it may retain information on water consumption, etc.

Figure 1A:
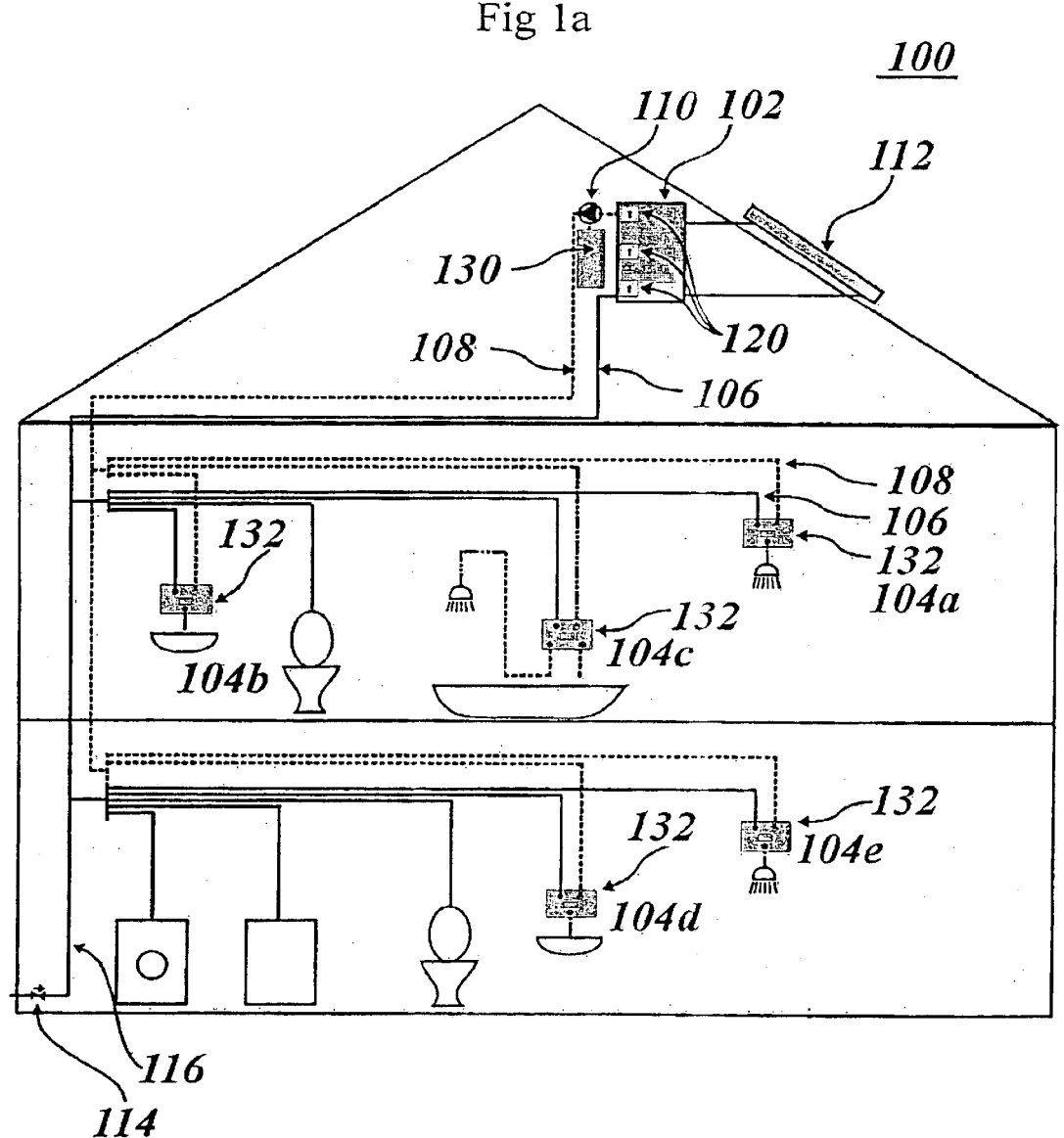
FIG. 1 shows a preferred embodiment of a system for improved domestic use and saving of heated water according to the present invention: (a) general view of a system with wireless communications; (b) details of the water tank/pump surroundings in (a); and (c) general view of a system with wired communications between each faucet and pump/sensors.
Figure 1B:
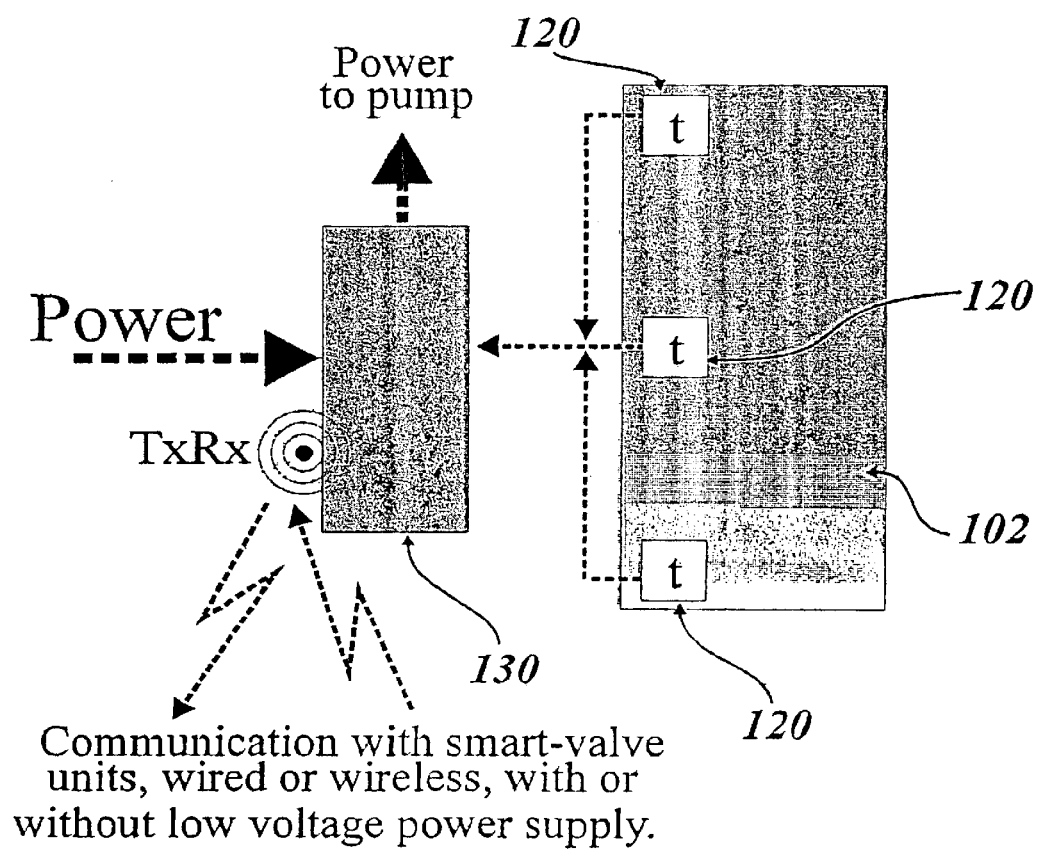
Figure 1C:
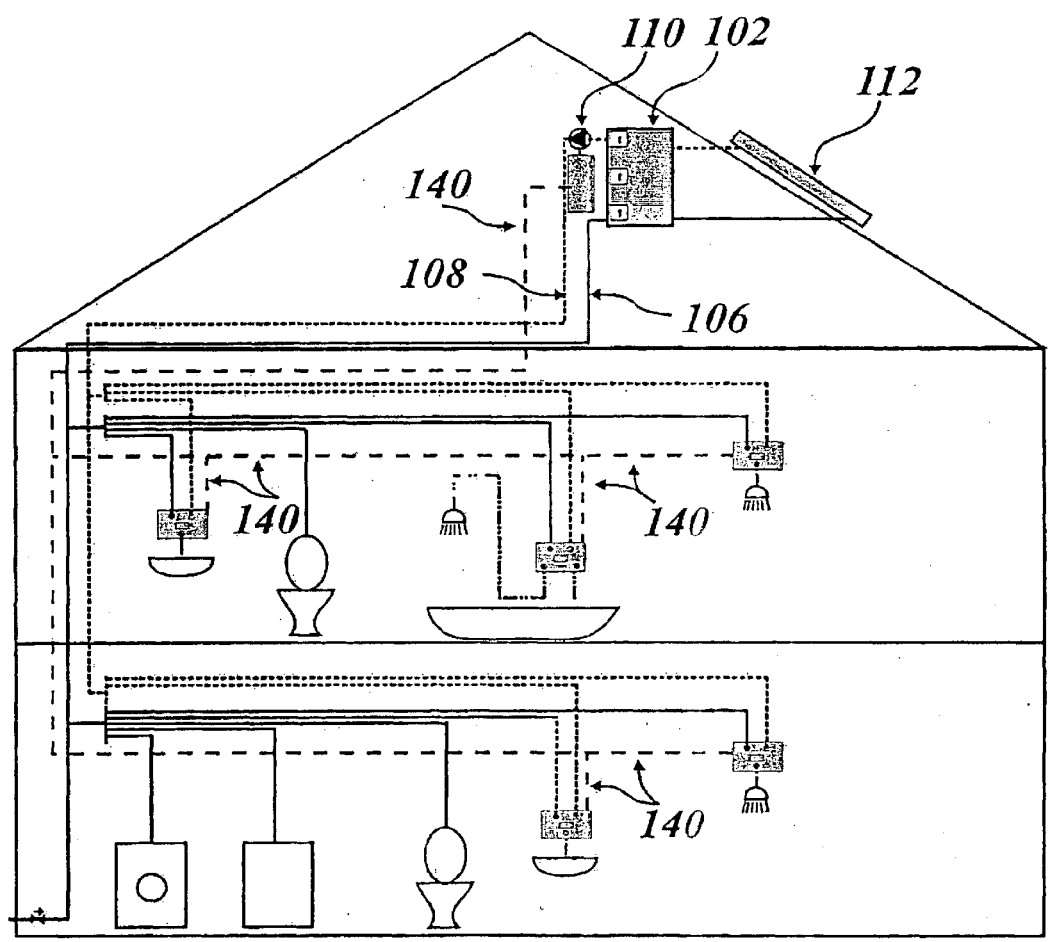

FIG. 1a shows a preferred embodiment of a system 100 of the present invention implemented in a housing unit (e.g. private home). System 100 supplies hot water from a central water heating device or hot water tank 102 to various water delivery devices 104. Devices 104 deliver water preferably at a desired temperature to a user, and are simply referred to as "faucets" 104. Thus, a faucet 104a represents a shower faucet, a faucet 104b represents a bathroom sink faucet, faucet 104c represents a bath and faucet 104d represents a kitchen faucet, all configured in general for both hot and cold water delivery. The hot water leaves the tank through a common hot water pipe 106, and the cold water is input to the tank through a common cold water pipe 108. Each faucet is connected to both hot water pipe 106 (or branches thereof) and to cold water pipe 108 (or branches thereof). A faucet may be further configured to provide water at a requested temperature using a circulation mechanism 202 (see FIG. 2) that ensures that any cold water in the hot water pipe is circulated internally (in a closed loop) and not dumped out of the system through the faucet, when the user requests hot water. The circulation is provided by a small pump 110 inserted in a loop that comprises the common hot and common cold water pipes. The pump may be any type of pump, for example a rotary pump. Advantageously, the faucet configuration allows a volume of cold water existing in the hot water pipe between the faucet and the water tank to be routed (or "flushed") into a cold water pipe that runs back to tank 102. This routing occurs internally in the faucet, by a coordinated opening and closing of faucet inlet valves, as described in more detail with reference to FIG. 2. Preferably, the inlet valves are "smart" valves, responsive to signals generated by a microcontroller preferably incorporated in the circulation mechanism, the microcontroller coupled and responsive to at least one temperature sensor used for sensing the water temperature. FIG. 1a also shows three temperature sensors 120 located at various heights in water tank 102. Sensors 120 can provide absolute temperature as well as a temperature gradient for the water in the tank. FIG. 1a also shows transceivers 130 (at the water tank) and 132 (on each smart faucet), which are used in a wireless communication configuration of the system to transfer commands and temperature information between each smart faucet and the water tank and/or pump. The wireless communication method is illustrated in more detail in the enlargement of the water tank and pump surroundings in FIG. 1b. Alternatively, the communication between each smart faucet and the pump and sensors (or more generally "actuation and sensing elements") may occur by a hard wire connection 140, shown in FIG. 1c. Alternatively yet, communication is provided between the smart valves.

A faucet comprising a microcontroller operative to control the actuation of at least two smart inlet valves (and optionally of an additional outlet valve) in response to temperature signals provided by the at least one temperature sensor is referred to herein as a "smart faucet". When the water near an outlet of the smart faucet gets to be hot enough, as sensed by the temperature sensor, the internal cold water routing stops, and the hot water, alone or mixed with cold water to a desired temperature are provided to the user.

Heating device or hot water tank 102 may be solar-powered by a solar panel 112. Alternatively, the water in tank 102 may be heated by any known heating source, e.g. electrical, gas, oil, etc. System 100 further preferably comprises a one-way ("no-return") valve 114, positioned preferably, but not necessarily, on a cold water main 116. Valve 114 ensures that the cold water from the hot water pipe circulated by pump 110 through the faucet is not pumped back (out of the housing unit) into the external cold water supply.

Figure 2:
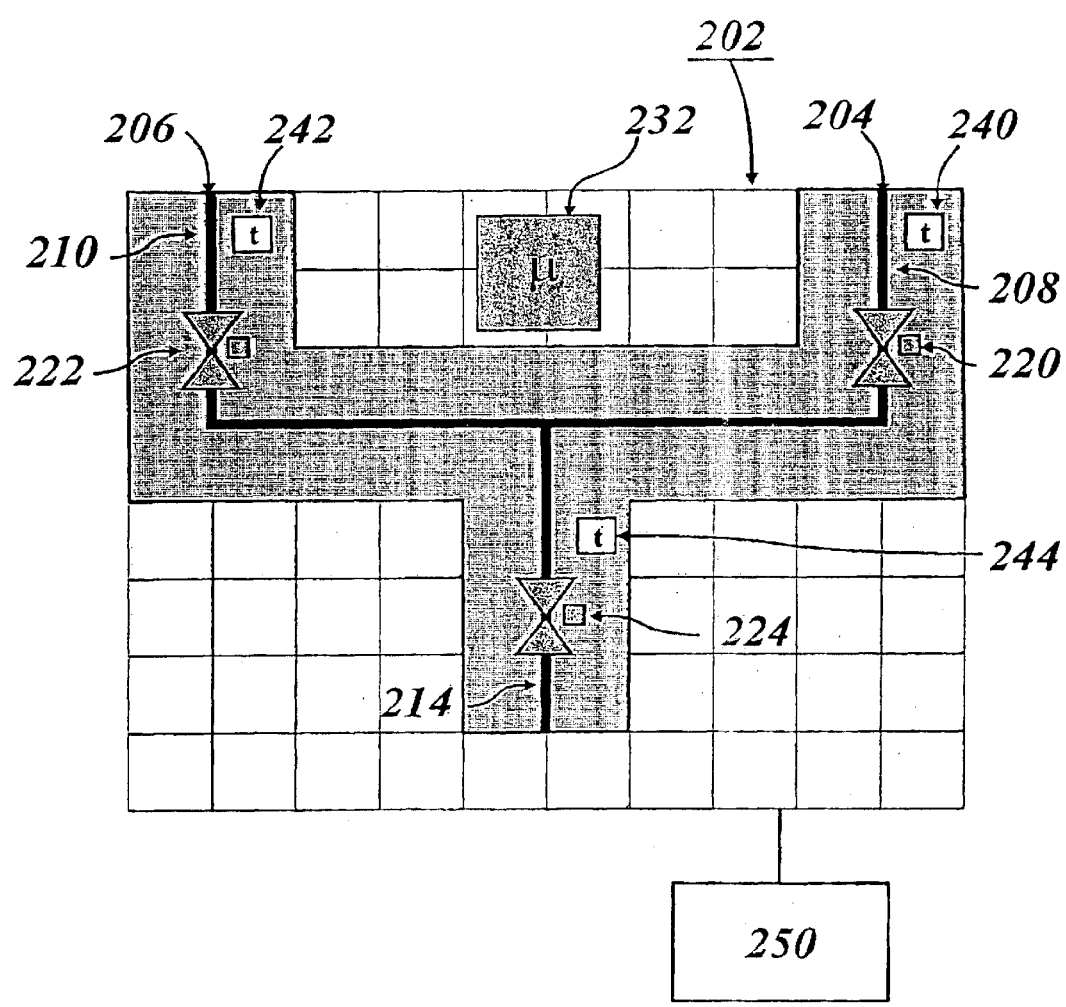
FIG. 2 shows details of a smart faucet according to the present invention that has a single outlet.
Figure 3:
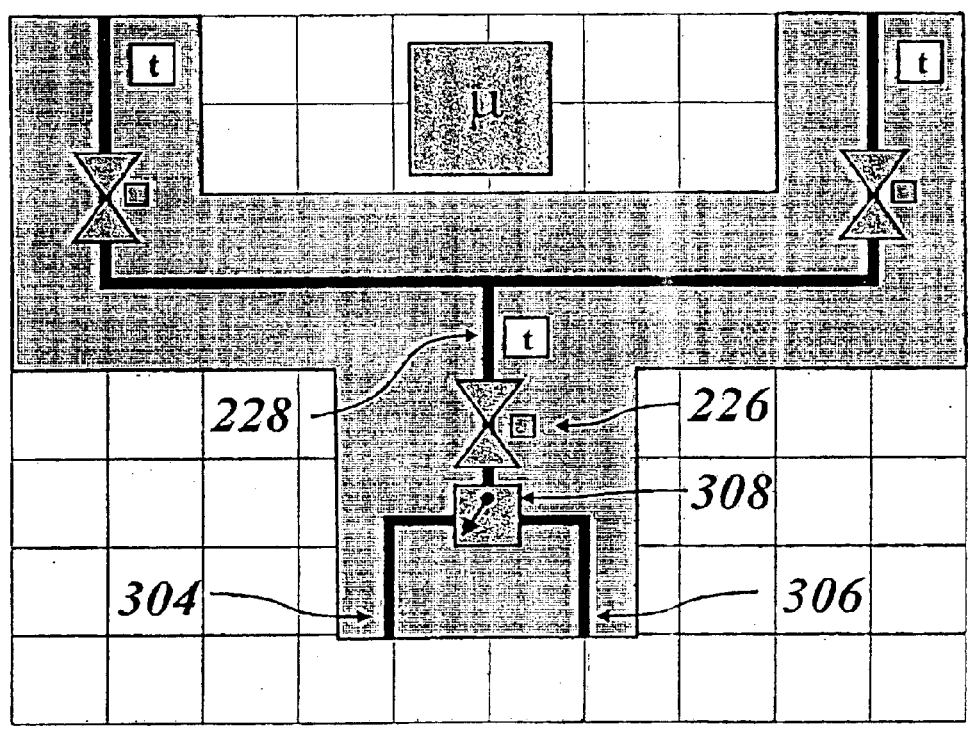
FIG. 3 shows details of a smart faucet according to the present invention that has two outlets.
Figure 5:
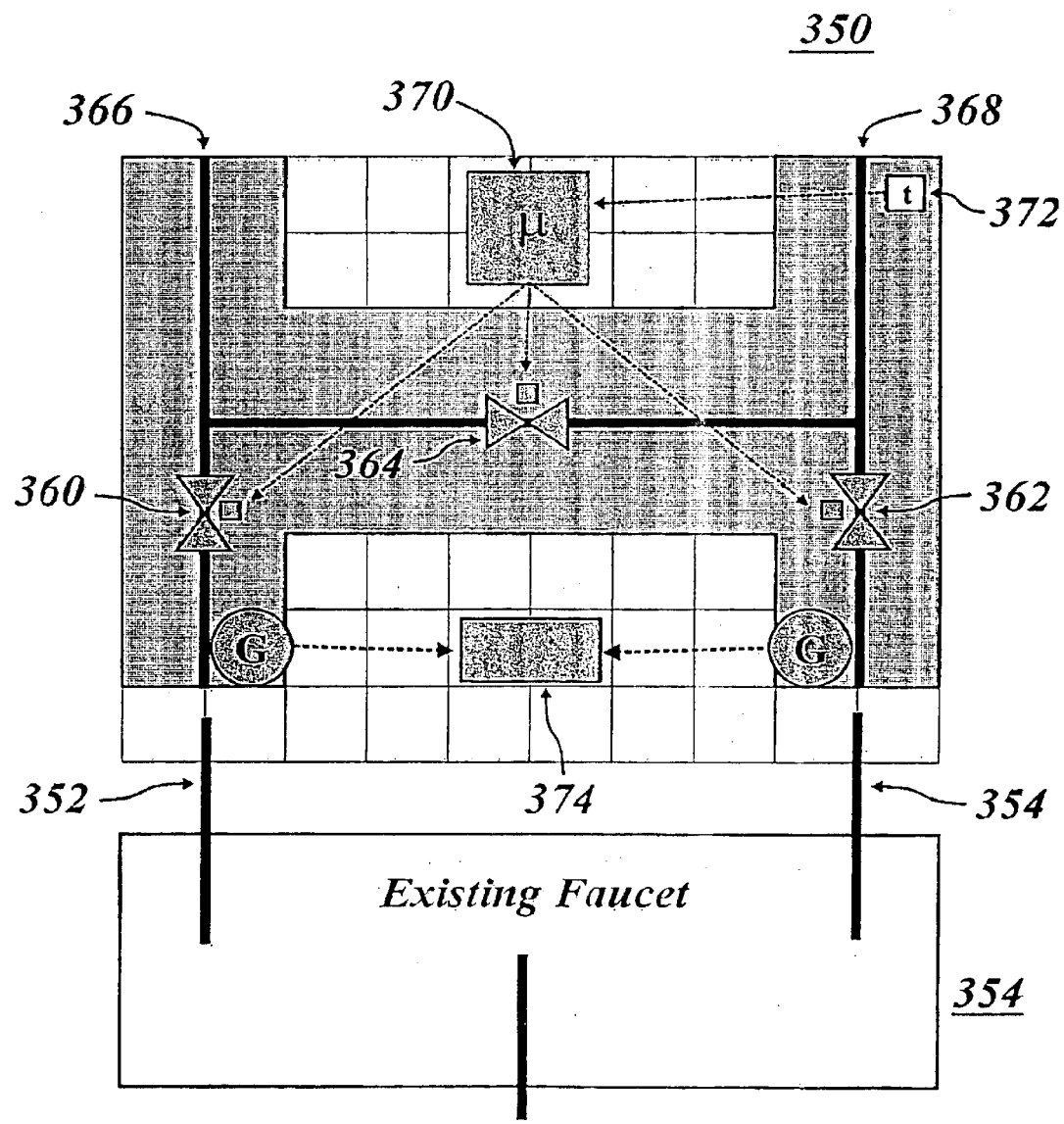
FIG. 5 shows an alternative embodiment of a smart faucet according to the present invention, in which the circulation mechanism is separate from the faucet.

FIGS. 2 and 3 show details of a basic embodiment of a smart faucet according to the present invention. In particular, faucet 104 includes, as mentioned, a circulation mechanism 202 that facilitates routing of cold water from a hot water pipe into a cold water pipe through the faucet. In FIGS. 2 and 3, the circulation mechanism is part of (internal to) the faucet. Faucet 104 further has a hot water inlet 204 that connects hot water pipe 106 to an internal hot water pipe section 208, and a cold water inlet 206 that connects cold water pipe 108 to an internal cold water pipe section 210. Pipe sections 208 and 210 meet at a common internal pipe section 212, which, in the embodiment of FIG. 2, is further connected to a single faucet outlet 214 (which may provide to the user mixed hot and cold water at any required temperature). Alternatively, as shown in the embodiment of FIG. 3, the faucet may include two separate outlets 304 and 306, for example an upper outlet for a shower head and a lower outlet for a bath. Separate outlets 304 and 306 may each provide mixed hot and cold water, and a choice between them may be made by a manual selector 308. Alternatively, as shown in the embodiment of FIG. 5, each outlet may have a smart valve (312 and 314) that may be controllable by an electronic controller (referred to hereinafter as "microcontroller") 232, and a choice between them may therefore be made by the microcontroller.

Circulation mechanism 202 includes two inlet valves 220 and 222 coupled to, and operative to control water flow through inlets 204 and 206 respectively, and an optional outlet valve 224 coupled to and operative to control water flow through outlet 214. In FIG. 3, the outlet valve, marked as 226 is coupled to a common internal pipe section 228 functionally identical with pipe section 212 and to the two separate outlets 304 and 306. Preferably, the two inlet valves and the outlet valve in FIGS. 2, 3 are "smart" valves, operative to open and close water flows upon reception of appropriate commands from microcontroller 232. Optionally, outlet valve 224 may be manual. Mechanism 202 further includes at least one temperature sensor 244 operative to sense water temperature and preferably located proximal to outlet valve 224. Note that in general, sensor 244 may be located in other sections of smart faucet 104 and still provide some of the benefits of the present invention, i.e. sense a water temperature and provide inputs to the microcontroller that affect the circulation. The circulation mechanism may include additional optional temperature sensors such as a hot water inlet sensor 240 operative to sense the temperature of the water at inlet 204 and a cold water inlet sensor 242 operative to sense the temperature of the water at inlet 206.

Figure 4:
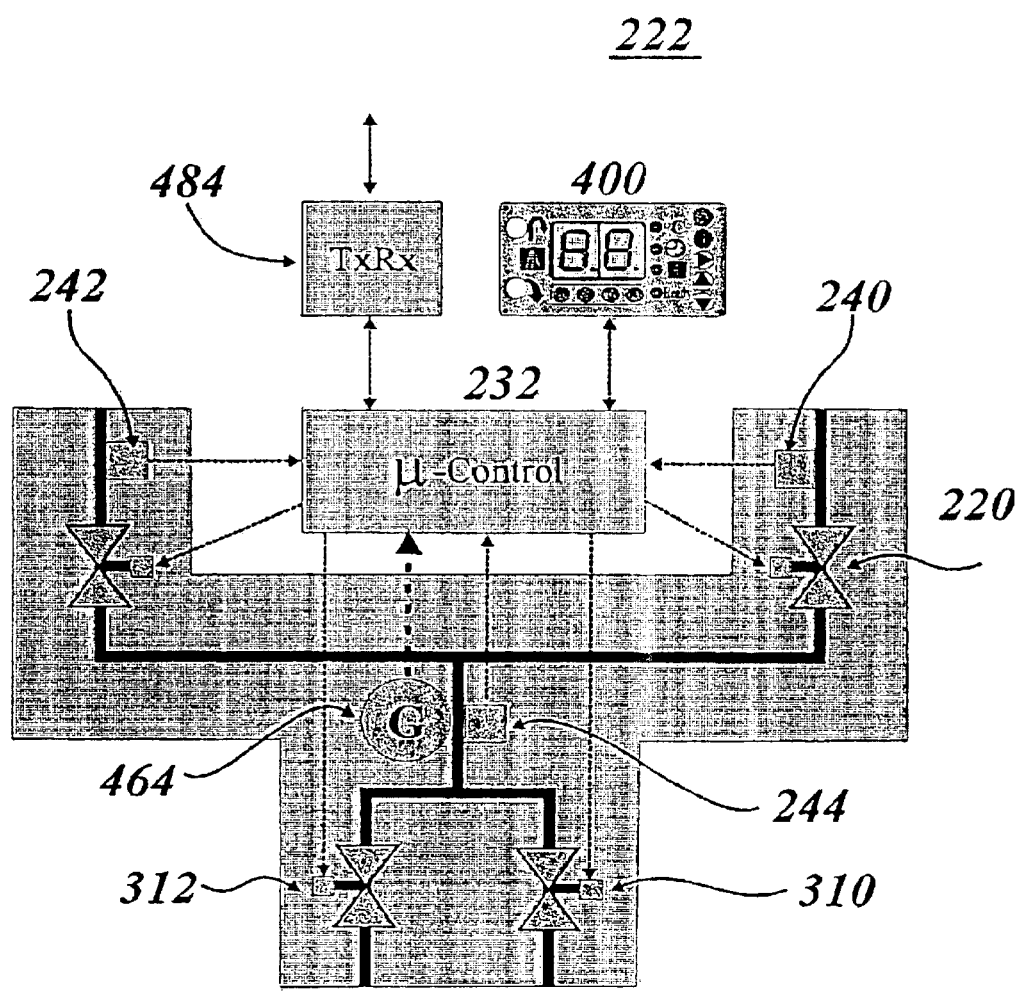
FIG. 4 shows schematically the functional connection of control and sensing elements in a smart faucet according to the present invention.

FIG. 4 shows schematically the functional connection of control and sensing elements in a smart faucet according to the present invention. Microcontroller 232 is coupled (by hard wire or wirelessly) to all smart valves (220, 222, 310 and 312) temperature sensors (240, 242, 244), and an input/output device 400. In case of wireless communication, microcontroller 232 tranmits and receives communications through a transceiver 484 (132 in FIG. 1). Alternatively yet, the communication between the microcontroller and the actuating elements may be by ultrasonic transmission through the water. Microcontroller 232 is preferably an application specific integrated circuit (ASIC) located inside the faucet (as part of the circulation mechanism). Alternatively, microcontroller 232 may be located separately from the faucet, for example in device 400. Microcontroller 232 is operative to provide the control commands for the actuation of the smart valves and of pump 110. Microcontroller 232 is also operative to receive temperature inputs from all temperature sensors, as well as inputs from input/output device 400, and, responsive to these inputs, to provide actuation signals as needed to the valves and to the pump. The operation of ASIC systems that receive inputs and sensed temperature and relay commands is well known in the art, for example in home appliances such as ovens, dishwashers, etc.

As mentioned, inlet valves 220 and 222 are preferably smart valves responsive to command signals generated by microcontroller 232 as a result of, for example, inputs from device 400. Power to operate the faucet's electronic, sensing and mechanical elements is preferably provided by a self-contained power source such as a battery 250 located in on near the faucet. Battery 250 may be any battery, e.g. a lithium battery that is powerful enough to satisfy the power demands of sensing, transmission/reception, actuation and control. Alternatively, the faucet may be connected to the regular domestic power grid or to a small water powered generator (turbine) 464 that also charges the battery. Generator 464 is preferably located in the water stream close to the faucet outlet, and is activated every time that water runs through the outlet. Alternatively, generator 464 may be located anywhere in the faucet where running water activates the small turbine, thereby generating power.

In an alternative embodiment of a smart faucet according to the present invention shown in FIG. 5, the circulation mechanism is external to and separate from the faucet itself. FIG. 5 shows a circulation mechanism 350 operative to perform the internal water circulation described above, connected through a cold water pipe section 352 and a hot water pipe section 354 to appropriate cold and hot water inlets in a faucet 356. Mechanism 350 is interposed between faucet 356 and the piping system, serving basically as a smart adapter. The advantage of such an adapter is that it allows retrofitting of existing systems, using existing (non-smart) water delivery devices. Adapter 350 comprises two smart inlet valves 360 and 362 connected respectively through an inlet end to external cold and hot water pipes 366 and 368, and through an outlet end to pipe sections 352 and 354 respectively. Valves 360 and 362 are further connected to each other through an additional smart valve 364. Smart valves 360, 362 and 364 are all coupled electronically to a microcontroller 370 operative to receive temperature inputs from a temperature sensor 372 coupled to the hot water pipe, and operative to actuate all smart valves to perform internal water circulation. Similar to mechanism in FIG. 4, mechanism 350 may be powered by a power source in the form of a battery 374, optionally backed by at least one water powered generator G. Alternatively, mechanism 350 may be powered solely by the battery or generator, or be connected to the regular power grid.

One of the major advantages of the communication system of the present invention that uses a microcontroller in each smart faucet is that any potential user may be provided with the information that one or more of the smart faucets are in use. Thus, if a potential user desires hot water at a predetermined temperature, he/she will be able to know beforehand if enough hot water is available (by, e.g., measurement of temperature in the water tank), and if someone else is using hot water. The microcontroller may even be configured to calculate a remaining hot water amount in the system, and to provide the potential user this information.

In operation, upon request by a user for cold water, the cold water inlet valve will open, while the hot water inlet valve will remain closed. Upon request for hot water at a desired temperature, the water temperature in the hot water tank (as determined by one or more sensors 120) is compared to the temperature shown on the panel (see FIG. 4) by pushing for example a hot water button 408. If the amount of hot water available in the tank is enough for a required use period (say a shower for 5 minutes), the internal circulation process is started in order to flush any cold water from the hot water pipe up to the outlet. The circulation stops (preferably automatically) once the water reaches the desired temperature at the relevant outlet. If there is not enough hot water in the system for the required use, no circulation is started.

To perform internal circulation, the inlet hot and cold water valves (220 and 222) are opened in a coordinated fashion following commands from the microcontroller, while the outlet valve remains closed. The hot and cold water "loop" is now operative to have water flow in it upon action of the pump. The microcontroller transmits an appropriate command to the pump to commence operation. As mentioned, the command transmission may occur by wired or wireless means, or by ultrasonic signals transmitted through the water itself. In the loop, hot water flows from the hot water tank through the hot pipe to the hot water inlet of the faucet, while cold water flows through the cold water inlet back toward the hot water tank. When sensor 244 senses the desired water temperature at the outlet, a visual or audio signal is generated to indicate this to the user. Upon this indication, the pump action is stopped manually (by for example pushing button 408 again) or automatically (by programmed instructions to the microcontroller), the cold water flow reverses direction, outlet valve 224 is opened, and the user receives water at the desired temperature. Note that if only water from the hot pipe is desired, the cold water inlet may be closed for the desired time period. Conversely, if only cold water is desired, the hot water inlet may be closed for the desired time period. The opening and closing of some or all of the valves (for example only the two inlet valves, or both inlet and outlet valves) and the temperature sensing are coordinated by the microcontroller.

Figure 6:
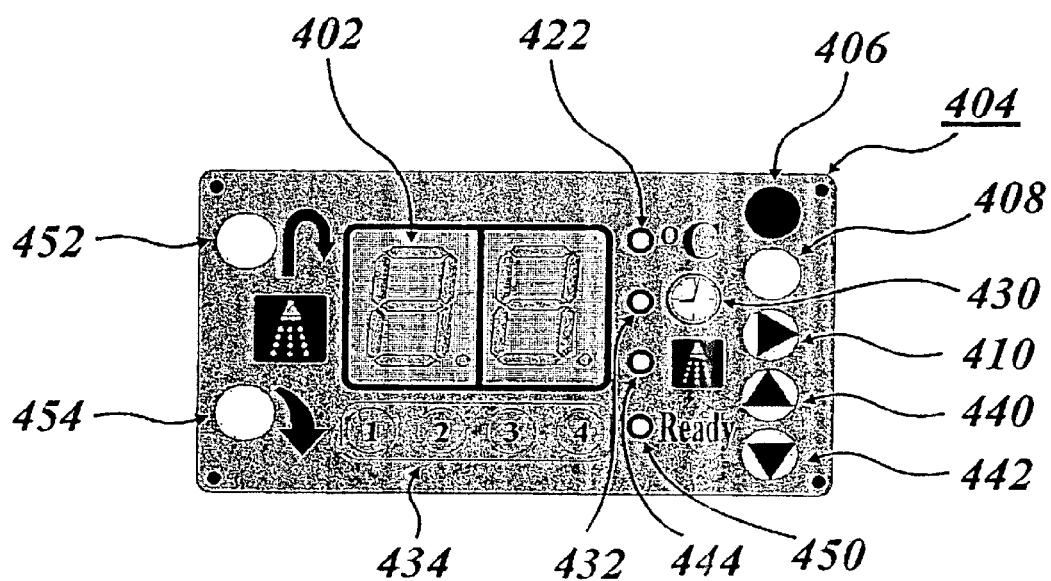
FIG. 6 shows details of an exemplary control panel for the smart faucet of the present invention.

FIG. 6 shows an embodiment of an exemplary input/output device 400 for the smart faucet of the present invention. Preferably, device 400 is in the form of a panel and will be referred to henceforth as a "control panel". Control panels of this type are well known in the art, for example in home appliances. The entire panel or parts thereof may be incorporated physically in the faucet. Alternatively, the entire panel or parts thereof may be located remotely from the faucet, for example on a wall next to the faucet. In a basic embodiment of a minimum panel configuration, the panel preferably includes a temperature readout 402, hot and cold water selection buttons 406 and 408 for selecting either hot or cold water. Optionally, the panel may include a variety of other elements. For example, the panel may include a function selection mechanism 410 for selecting between different functions such as "temperature", "time", "flow", etc. Each function selected may be indicated by appropriate indicators: 422 for a temperature selection indicator, 432 for a time selection indicator and 444 for a water flow strength indicator. "Up" and "Down" buttons 440 and 442 are used for changing up and down (setting) the value of a chosen function. The panel may optionally further include a timer 430 for setting a desired water use time, a "time" indicator 432, memory means 434 for storing set temperatures and/or times, and outlet selection buttons 452 and 454 for selecting one of two outlets.

If cold water is desired, pressing button 406 opens the cold water inlet valve. If hot water is desired at a set temperature chosen by function selection mechanism 410, pressing button 408 opens both hot and cold water inlet valves and actuates the pump while closing the outlet valve, thereby purging the hot water pipe of any cold water. This actuation is in response for an appropriate code sent by the microcontroller to each actuated element. Once hot water reaches the faucet and the right temperature is sensed by sensor 244 and indicated by readout 402 or by an optional "Ready" lamp 450, the pump (i.e. the circulation) is stopped. This circulation stop is preferably automatic. An additional push on button 408 opens the outlet valve, providing the required hot water.

A constant desired temperature may be kept by a close-loop control involving the temperature sensor, microcontroller and both inlet valves. If the hot water supply decreases (e.g. if the temperature of the water in the hot water tank decreases), the close-loop control may change the ratio of hot/cold water supplied at the outlet by controlling for example the opening times of each inlet valve. In the case in which the faucet includes two outlets with electronic selection, the desired valve will be selected according to the button pressed. The desired temperature will be maintained by constant regulation of the inflow (inlet) and outflow (outlet) valves. To the extent the water coming from the tank becomes cold, a warning will be given and the water will be turned off automatically. To the extent that during or after the waiting time, the user wishes to increase or decrease the desired water temperature, he may do so by pressing the "Arrow Up" or "Arrow Down" buttons while the "Temperature" light is on. A timer (using the timer function) may be set to determine both usage times and breaks between uses (e.g. for soaping).

Figure 7A:
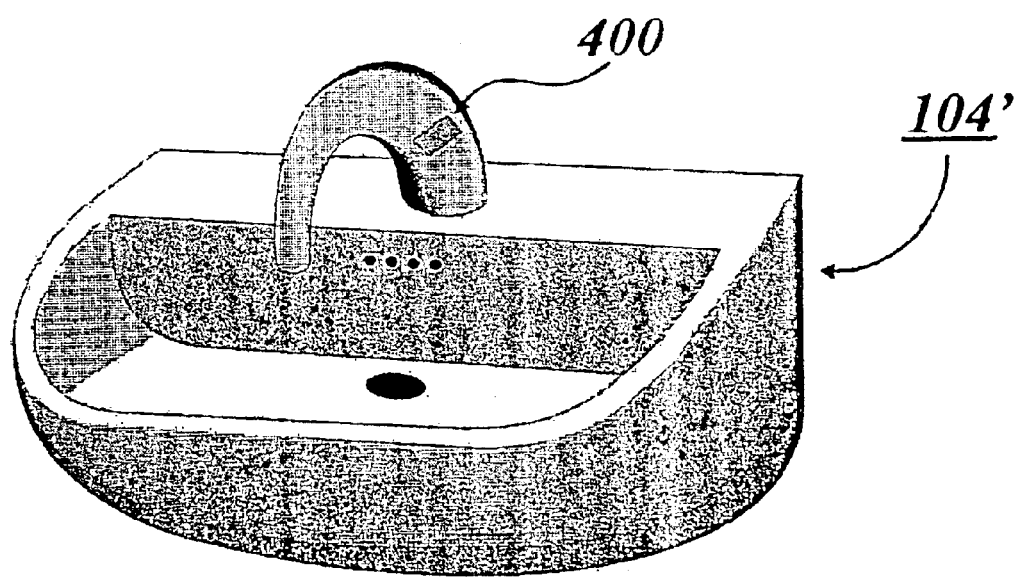
FIG. 7 shows various configurations of a smart faucet with a single outlet: a) automatic outlet control, and b) automatic outlet proximity control.
Figure 7B:
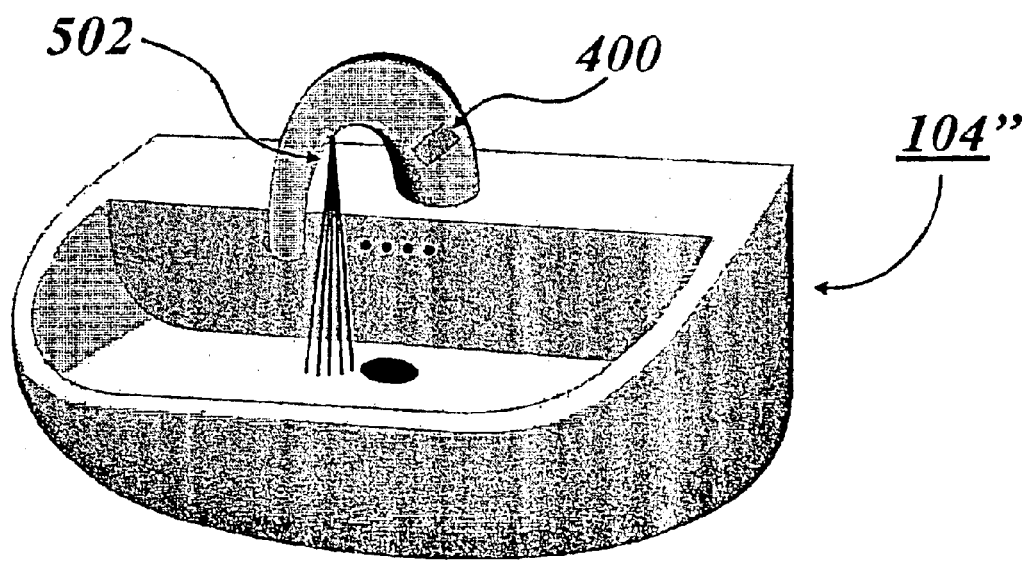

FIG. 7a shows a sink faucet 104' having an integral control panel 400. FIG. 7b shows a similar faucet 104" that incorporates a control panel 400 and a proximity mechanism 502 that is used to actuate the water flow. Proximity mechanisms are known, but their incorporation in smart faucets as disclosed herein is new and inventive. In a proximity actuated faucet, the mechanism actuates the faucet outlet and water is supplied at the desired temperature. When the water flow stops, the pump driven circulation is automatically started so that water at the desired temperature is always available. Optionally, a delay may be programmed into the smart faucet between proximity actuation and water supply, during which time the circulation is actuated, bringing the water to a predetermined desired temperature.

Water flow (pressure) may be controlled by setting function selecting mechanism 410 to "flow" and using Up and Down buttons 440 and 442. A "default" water flow or pressure may be set at 50% (or any other percentage) of maximum flow.

If the faucet is of the type that includes memories, there will be one or more programmable memories in memory means 432. Each such memory may store variables that include temperature, water use time, break time, wait time, water force, etc. A long press on the "Memory" button may enter into the selected memory the temperature, water force and time selected. A short press on any of the "Memory" buttons selects the appropriate value(s) from the memory.

While the invention has been described with respect to a limited number of embodiments, it will be appreciated that many variations, modifications and other applications of the invention may be made.

What is claimed is:

1. A method for delivering water to a user at a desired temperature comprising the steps of:
   a. providing a piping system that includes a hot water pipe and a cold water pipe;
   b. providing a water delivery device coupled to said piping system and configured to allow internal circulation of water from said hot to said cold pipe through a circulation mechanism included in the water delivery device, said water delivery device having at least one outlet;
   c. bringing the water temperature near said at least one outlet to the desired temperature by purging said hot water pipe of any water having a temperature lower than said desired temperature, said purging including transferring of said lower temperature water through said water delivery device to said cold pipe; and
   d. delivering water at the desired temperature to the user through said outlet.

2. The method of claim 1, wherein said purging includes actuating a pump coupled to said piping system and said water delivery device, said pump driving said internal circulation, and wherein said step of delivering includes stopping said pump, thereby stopping said internal circulation.

3. The method of claim 2, further comprising the step of sensing a water temperature near said outlet and wherein said actuating and said stopping are done in response to said temperature sensing.

4. The method of claim 1, further comprising the step of providing a controller included in said circulation mechanism and operative to control said bringing of the water temperature near said at least one outlet to the desired temperature.

5. The method of claim 1, further comprising the step of providing a proximity mechanism coupled to said water delivery device and operative to effect said delivering.

6. A system for providing a user with water at a desired temperature comprising:
   a. a piping system that includes a hot water pipe and a cold water pipe;
   b. a pump coupled to said piping system; and
   c. a water delivery device coupled to said piping system and to said pump and operative to allow circulation of water from said hot water pipe to said cold water pipe through a circulation mechanism included in said water delivery device, said circulation performed prior to delivery of water at a desired temperature to the user, whereby said circulation purges said hot water pipe of any cold water contained therewithin.

7. The system of claim 6, wherein said water delivery device includes:
   i. a hot water inlet coupled to said hot water pipe,
   ii. a cold water inlet coupled to said cold water pipe, and
   iii. a common outlet operative to receive hot and cold water flows from said hot and cold water inlets and to facilitate said water delivery, and wherein said circulation mechanism further includes
   iv. a hot water inlet valve and a cold water inlet valve respectively coupled to and operative to control water flow through said hot and cold water inlets,
   v. at least one temperature sensor operative to sense water temperature, and
   vi. a controller responsive to inputs from said at least one temperature sensor and operative to actuate said hot and cold water inlet valves and said pump to obtain said water circulation and delivery.

8. The system of claim 7, further comprising an input/output device configured to provide input parameters to said controller and to receive and display output indications from said controller.

9. The system of claim 8, wherein said input parameters include a parameter selected from the group consisting of a set temperature, a set use time, a set break time, a water pressure and a combination thereof.

10. The system of claim 8, wherein said output indications are selected from the group consisting of a temperature indication, a time indication and a water pressure indication.

11. The system of claim 6, further including an optional proximity sensor coupled to said water delivery device and operative to activate said water delivery through a proximity effect.

12. A water delivery device comprising:
   a. a hot water inlet coupled to a hot water pipe;
   b. a cold water inlet coupled to a cold water pipe;
   c. a first outlet operative to receive hot and cold water flows from said hot and cold water inlets and to facilitate water delivery to a user; and
   d. a circulation mechanism operative to allow circulation of water from said hot water pipe to said cold water pipe prior to delivery of water at a desired temperature to the user through said first outlet, wherein said circulation mechanism further includes a controller responsive to inputs from at least one temperature sensor and operative to control said circulation.

13. The water delivery device of claim 12, wherein said circulation mechanism includes:
   i. a hot water inlet valve and a cold water inlet valve respectively coupled to and operative to control water flow through said hot and cold water inlets, and
   ii. at least one temperature sensor operative to sense water temperature, and wherein said controller is operative to actuate said hot and cold water inlet valves to obtain said water circulation and delivery.

14. The water delivery device of claim 13, further comprising a mechanism for inputting parameters to said controller and for outputting indications from said controller.

15. The water delivery device of claim 14, wherein said input parameters include a parameter selected from the group consisting of a set temperature, a set use time, a set break time, a water pressure and a combination thereof.

16. The water delivery device of claim 14, wherein said output indications are selected from the group consisting of a temperature indication, a time indication and a water pressure indication.

* * * * *